US010065471B2

(12) United States Patent
Nishizawa (10) Patent No.: US 10,065,471 B2
(45) Date of Patent: Sep. 4, 2018

(54) COIL SPRING FOR VEHICLE SUSPENSION

(71) Applicant: NHK SPRING CO., LTD., Yokohama-shi, Kanagawa (JP)

(72) Inventor: Shinichi Nishizawa, Walled Lake, MI (US)

(73) Assignee: NHK SPRING CO., LTD., Tokyo (JP)

( * ) Notice: Subject to any disclaimer, the term of this patent is extended or adjusted under 35 U.S.C. 154(b) by 0 days.

(21) Appl. No.: 15/421,380

(22) Filed: Jan. 31, 2017

(65) Prior Publication Data

US 2018/0215225 A1    Aug. 2, 2018

(51) Int. Cl.
*B60G 11/14* (2006.01)
*F16F 1/12* (2006.01)

(52) U.S. Cl.
CPC .............. *B60G 11/14* (2013.01); *F16F 1/123* (2013.01); *B60G 2202/312* (2013.01); *B60G 2206/426* (2013.01); *B60G 2206/81035* (2013.01)

(58) Field of Classification Search
CPC .............. B60G 11/14; B60G 2202/312; B60G 2206/426; B60G 2206/81035; F16F 1/123
USPC ............................. 267/286, 166, 167, 179, 4
See application file for complete search history.

(56) References Cited

U.S. PATENT DOCUMENTS

| 176,174 | A | * | 4/1876 | French | 267/286 |
|---|---|---|---|---|---|
| 2,473,027 | A | * | 6/1949 | Keysor | B21F 3/04 192/41 S |
| 4,111,407 | A | * | 9/1978 | Stager | F16F 1/08 267/166 |
| 4,903,985 | A | | 2/1990 | Muhr et al. | |
| 5,048,859 | A | * | 9/1991 | Nishikuma | B60G 3/20 180/253 |
| 5,577,771 | A | * | 11/1996 | Lee | B60G 7/006 267/140.15 |
| 5,769,722 | A | * | 6/1998 | Uehara | F16F 15/12313 267/180 |
| 7,841,088 | B2 | * | 11/2010 | Ogura | B60G 15/07 267/180 |

(Continued)

FOREIGN PATENT DOCUMENTS

| CA | 2981220 A1 | 10/2016 |
|---|---|---|
| EP | 0728602 A1 | 8/1996 |

(Continued)

OTHER PUBLICATIONS

International Search Report (ISR) and Written Opinion dated Mar. 13, 2018 issued in counterpart International Application No. PCT/JP2017/047279.

*Primary Examiner* — Thomas J Williams
*Assistant Examiner* — Mariano Sy
(74) *Attorney, Agent, or Firm* — Holtz, Holtz & Volek PC (57) ABSTRACT

A coil spring for a vehicle suspension according to one embodiment includes a lower end turn portion, an upper end turn portion, and a cylindrical effective portion between the lower end turn portion and the upper end turn portion. In at least one of the upper end turn portion and the lower end turn portion, a taper portion having a taper length and a taper thickness for controlling a force line of the coil spring is formed. The taper portion is formed such that the thickness is reduced in a tapered way from a thickness varying portion provided in the middle of the end turn portion toward a distal end of the wire along its length. The thickness varying portion is arranged at a position close to the force line.

11 Claims, 7 Drawing Sheets

(56) References Cited

U.S. PATENT DOCUMENTS

| | | | |
|---|---|---|---|
| 8,490,285 B2* | 7/2013 | Knebel, III | F16F 1/043 |
| | | | 267/167 |
| 9,770,957 B2* | 9/2017 | Sano | F16F 1/04 |
| 2001/0035601 A1* | 11/2001 | Imaizumi | F16F 1/047 |
| | | | 267/286 |
| 2004/0123769 A1* | 7/2004 | Nishimura | B60G 11/14 |
| | | | 105/218.2 |
| 2004/0169322 A1 | 9/2004 | Ogura et al. | |
| 2008/0157449 A1* | 7/2008 | Brandt | B60G 15/063 |
| | | | 267/286 |
| 2013/0099435 A1* | 4/2013 | Matsuoto | F16F 1/047 |
| | | | 267/166 |

FOREIGN PATENT DOCUMENTS

| | | | |
|---|---|---|---|
| JP | 01156119 A | 6/1989 |
| JP | 2642163 B2 | 8/1997 |
| JP | 10281197 A | 10/1998 |
| JP | 2005016645 A | 1/2005 |
| JP | 2008241043 A | 10/2008 |
| JP | 2011002095 A | 1/2011 |
| JP | 2012211702 A | 11/2012 |
| JP | 2016047722 A | 4/2016 |
| JP | 2016191445 A | 11/2016 |

* cited by examiner

COIL SPRING FOR VEHICLE SUSPENSION

BACKGROUND OF THE INVENTION

1. Field of the Invention

The present invention relates to a coil spring for a vehicle suspension which is used in a suspension of a vehicle such as a car.

2. Description of the Related Art

As a method of producing a coil spring, a method of forming the coil spring by hot working and a method of forming the coil spring by cold working are known. The coil spring formed by hot working is formed into a helical shape by winding a wire that is heated to a high temperature (for example, an austenitizing temperature of steel) around a mandrel at a predetermined pitch. The length of the wire is equivalent to that of one coil spring. In this specification, an apparatus which produces a coil spring by hot working is referred to as a hot forming coiling machine, and the coil spring formed by hot working is referred to as a hot formed coil spring. Since the hot forming coiling machine winds a wire which has been softened as a result of heating around the mandrel, it is suitable for producing a coil spring having a relatively large wire diameter. In order to form the hot formed coil spring, a wire having a length equivalent to that of one coil spring is wound around the mandrel. Accordingly, before coiling, a plastic working portion having a shape corresponding to the purpose can be formed at an end portion of the wire.

In contrast, a coil spring formed by cold working is produced in such a way that a wire having a length equivalent to that of multiple coil springs is supplied between a first pin and a second pin of the coiling machine, and the wire is formed to be arc-shaped continuously between the first pin and the second pin. When the wire is formed into one coil spring, the wire is cut by a cutter. In this specification, an apparatus which produces a coil spring by cold working is referred to as a cold forming coiling machine, and the coil spring formed by cold working is referred to as a cold formed coil spring. The cold forming coiling machine can produce a coil spring of a special shape other than a cylindrical shape. For the cold formed coil spring, a long wire is used as the material, and each time the wire is formed into one coil spring, the wire is cut. Accordingly, it is difficult to form a plastic working portion having a shape corresponding to the purpose at an end portion of the wire before coiling.

JP 1989-156119A or JP 2642163B discloses a coil spring used for a strut-type suspension. In order to maximize the function of a vehicle suspension coil spring, it is important to appropriately control a force line of the coil spring. Hence, conventionally, the force line has been controlled by devising the shape of an effective portion of a coil spring and the shape of a spring seat, and adjusting the relative position of the effective portion to an end turn portion. However, controlling the force line is not at all easy even by a person skilled in the art.

BRIEF SUMMARY OF THE INVENTION

An object of the present invention is to provide a vehicle suspension coil spring which can control the force line based on the shape of a wire of an end turn portion, and is also suitable for production by a hot forming coiling machine.

An embodiment of the present invention relates to a vehicle suspension coil spring including a wire formed into a helical shape, and being arranged between a lower spring seat and an upper spring seat. The vehicle suspension coil spring comprises a lower end turn portion which is in contact with the lower spring seat, an upper end turn portion which is in contact with the upper spring seat, an effective portion of a cylindrical shape between the lower end turn portion and the upper end turn portion, and a force line, which is a straight line, connecting a center of force applied to the lower end turn portion and a center of force applied to the upper end turn portion in a state in which the force which compresses the effective portion is applied to the lower end turn portion and the upper end turn portion. Further, the coil spring comprises a taper portion having a taper length and a taper thickness for controlling the force line in at least one of the lower end turn portion and the upper end turn portion. In this taper portion, a thickness of the wire is reduced in a tapered way from a thickness varying portion, which is provided in the middle of the corresponding end turn portion, toward a distal end of the wire along its length, and the thickness varying portion is arranged at a position close to the force line. The taper portion may be formed at only the lower end turn portion or the upper end turn portion. Alternatively, the taper portion may be formed at both of the lower end turn portion and the upper end turn portion. The taper portion is, for example, a taper portion of a flat tapered shape having an upper surface and a lower surface that are flat. In another example, the taper portion may be round tapered, that is, the entire circumference of the wire is reduced toward a distal end of the wire while keeping a circular cross section all the way. For example, in the case of a cold formed coil spring, by polishing an end portion of a coiled wire, the taper portion may be formed.

According to the vehicle suspension coil spring of the present embodiment, the force line can be controlled in accordance with the length of the taper portion formed at the end turn portion, the thickness of the taper, etc. Thus, in a state in which the coil spring is incorporated into a vehicle suspension, the coil spring can exhibit a function desired as a suspension spring. Moreover, the above-mentioned taper portion can be formed in advance by plastically working the end portion of the wire before coiling the wire. Accordingly, the coil spring in this case can be produced by a hot coiling machine.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A suspension coil spring according to one embodiment of the present invention will now be described with reference to FIGS. 1 to 9.

Figure 1:
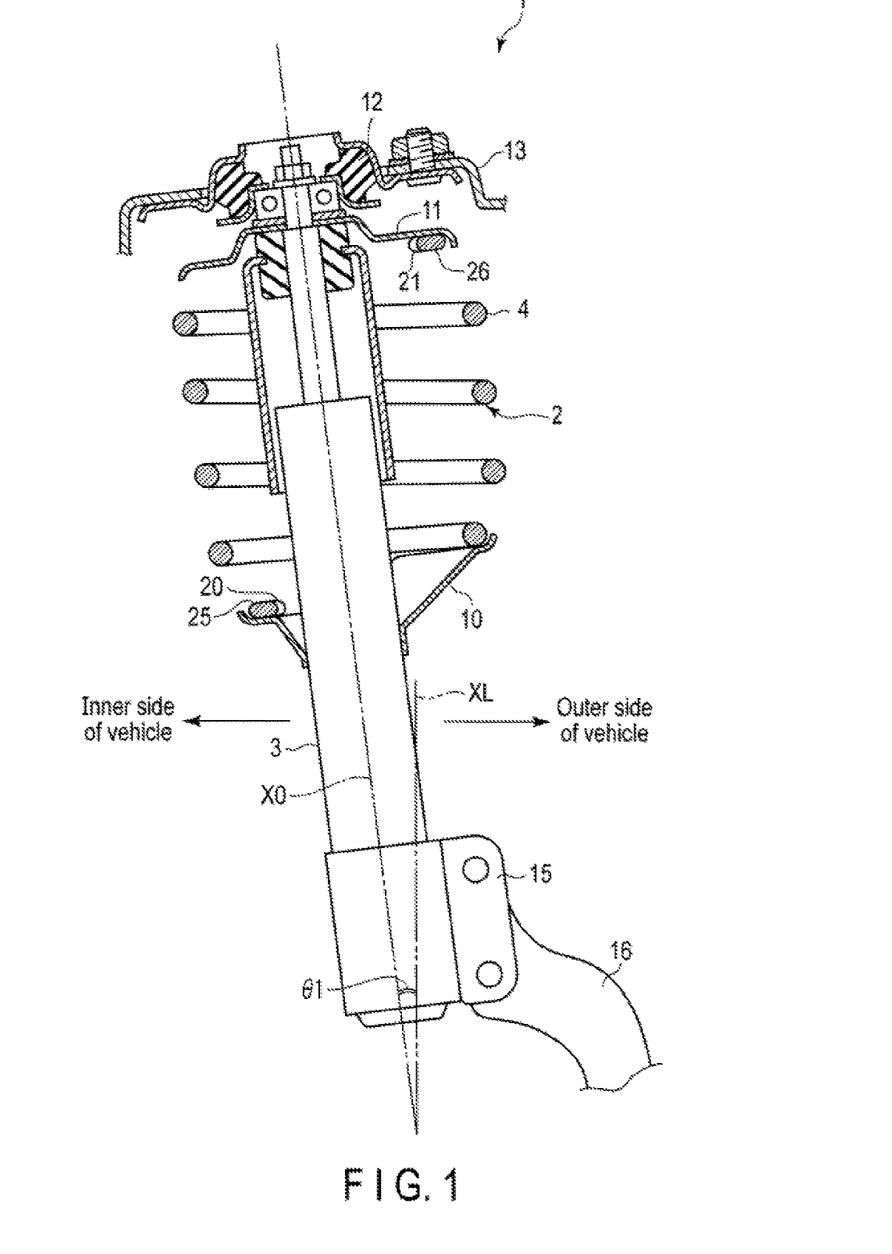
FIG. 1 is a cross-sectional view of a vehicle suspension comprising a coil spring according to a first embodiment.

A McPherson-strut-type suspension 1 shown in FIG. 1 comprises a vehicle suspension coil spring 2 (hereinafter simply referred to as a coil spring 2), and a strut 3 formed of a shock absorber. The coil spring 2 comprises a wire 4 made of spring steel which is formed into a helical shape. The coil spring 2 is mounted in the suspension 1 in a state in which it is compressed between a lower spring seat 10 and an upper spring seat 11. An upper end of the strut 3 is mounted on a vehicle body 13 via a mount insulator 12. A bracket 15 is provided at the lower part of the strut 3. A knuckle member 16 (only a part of which is shown) for supporting an axle is mounted on the bracket 15. The strut 3 is mounted in the vehicle body 13 in such a state that an upper end side of the strut 3 is inclined, more specifically, axis X0 is inclined toward the inner side of the vehicle at an angle of θ1 with respect to a vertical line XL of gravity. The coil spring 2 is compressed between the lower spring seat 10 and the upper spring seat 11. The lower spring seat 10 can move relatively to the upper spring seat 11 in the direction of axis X0 of the strut 3.

Figure 2:
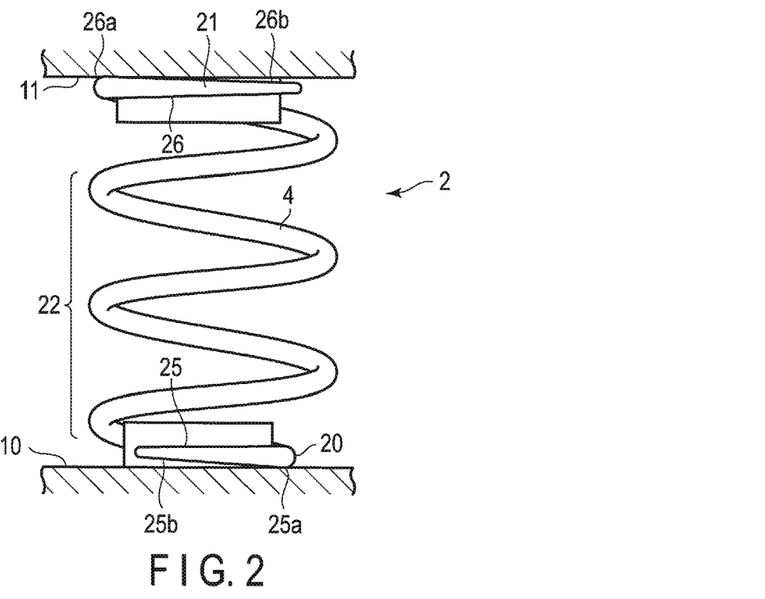
FIG. 2 is a side view of the coil spring shown in FIG. 1 in its free shape in which the coil spring is not compressed.
Figure 3:
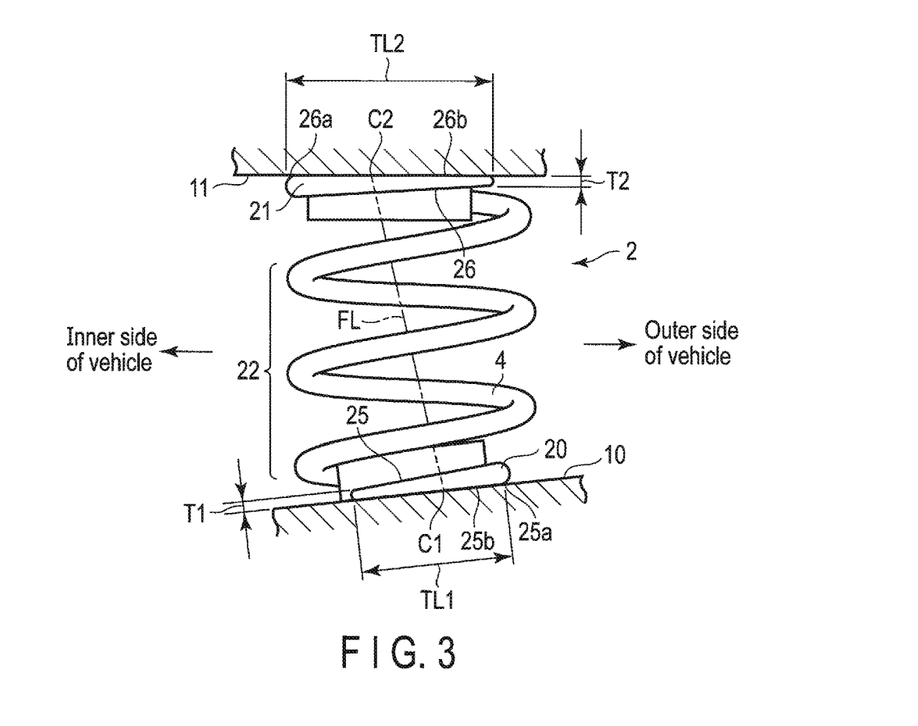
FIG. 3 is a side view of the coil spring in a state in which it is compressed to a rebound position.
Figure 4:
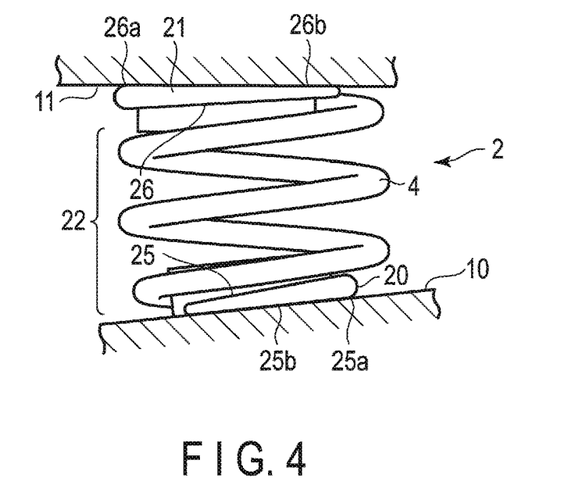
FIG. 4 is a side view of the coil spring in a state in which it is compressed to a neutral position.
Figure 5:
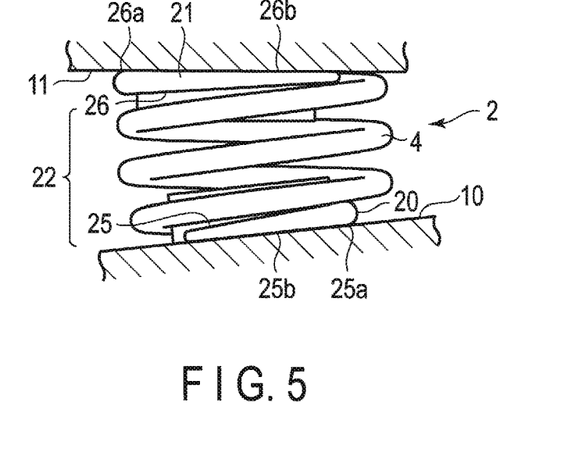
FIG. 5 is a side view of the coil spring in a state in which it is compressed to the maximum.

FIG. 2 shows the coil spring 2 in its free shape in which no compressive load is applied and the spring seats 10 and 11. FIG. 3 shows the state where the coil spring 2 is compressed to a rebound position. FIG. 4 shows the state where the coil spring 2 is compressed to a neutral position. FIG. 5 shows the state where the coil spring 2 is compressed to the maximum.

The coil spring 2 includes a lower end turn portion 20 supported by the lower spring seat 10, an upper end turn portion 21 supported by the upper spring seat 11, and an effective portion 22 between the end turn portions 20 and 21. A lower surface of the lower end turn portion 20 is opposed to an upper surface of the lower spring seat 10. The lower end turn portion 20 is a part which contacts the lower spring seat 10 in a state in which the coil spring 2 is compressed, and refers to an area extending to a point around 0.6 to 0.7 turns, for example, from a lower end of the wire 4. However, since the length of the end turn portion 20 depends on the position of the lower end of the wire 4, the extending range of the end turn portion 20 is not limited to the above.

An upper surface of the upper end turn portion 21 is opposed to a lower surface of the upper spring seat 11. The upper end turn portion 21 is a part which contacts the upper spring seat 11 in a state in which the coil spring 2 is compressed, and refers to an area extending to a point around 0.8 turns, for example, from an upper end of the wire 4. However, since the length of the end turn portion 21 depends on the position of the upper end of the wire 4 and the number of turns of the coil spring, the extending range of the end turn portion 21 is not limited to the above. The effective portion 22 is a portion where the adjacent winding portions of the wire 4 do not contact each other in a state in which the coil spring 2 is compressed to the maximum, and which functions effectively as a spring.

As shown in FIG. 3, in a state in which the coil spring 2 is compressed, a center of force C1 applied to the end turn portion 20 exists between the lower spring seat 10 and the end turn portion 20. The center of force C1 is not necessarily the center of the turn (the center of curvature) of the end turn portion 20. That is, the center of force C1 depends on a distribution of force of contact between the spring seat 10 and the end turn portion 20. Also, a center of force C2 applied to the end turn portion 21 exists between the upper spring seat 11 and the end turn portion 21. In this specification, a line connecting the center of force C1 applied to the lower end turn portion 20 and the center of force C2 applied to the upper end turn portion 21 will be referred to as a force line (load axis) FL. The position of the force line (i.e., the force line position) may be referred to as FLP for short. In the free shape in which no compressive load is applied, the effective portion 22 has a shape substantially free of bowing about a coil central axis (i.e., a shape that is cylindrical). That is, a coil diameter of the effective portion 22 is constant about the coil central axis.

In this embodiment, the coil spring 2 includes a first taper portion 25 formed at the lower end side of the wire 4, and a second taper portion 26 formed at the upper end side of the wire 4. However, in the other embodiment, a taper portion may be formed at only the lower end side or the upper end side of the wire 4. The taper portion includes a taper length and a taper thickness for controlling the position of the force line FL (FLP) and the inclination of the force line FL. In the first taper portion 25 of this embodiment, the thickness of the wire 4 is reduced in a tapered way for a first length TL1 from a first thickness varying portion 25a, which is provided in the middle of the lower end turn portion 20, toward the lower end of the wire 4 along its length. In other words, the first thickness varying portion 25a is provided at an intermediate portion of the lower end turn portion 20. The thickness of the first taper portion 25 at a distal end is referred to as a first taper thickness T1. The first thickness varying portion 25a is located at a position close to a lower end of the force line FL.

In the second taper portion 26, the thickness of the wire 4 is reduced in a tapered way for a second length TL2 from a second thickness varying portion 26a, which is provided in the middle of the upper end turn portion 21, toward the upper end of the wire 4 along its length. In other words, the second thickness varying portion 26a is provided at an intermediate portion of the upper end turn portion 21. The thickness of the second taper portion 26 at a distal end is referred to as a second taper thickness T2. The second thickness varying portion 26a is located at a position close to an upper end of the force line FL.

As shown in FIG. 2, in the free shape in which the coil spring 2 is not compressed, the first thickness varying portion 25a is in contact with the lower spring seat 10, but a lower surface 25b of the first taper portion 25 is separated from the lower spring seat 10. Although the second thickness varying portion 26a is in contact with the upper spring seat 11, an upper surface 26b of the second taper portion 26 is separated from the upper spring seat 11. However, depending on the configuration of the coil spring, the taper portion may be in contact with the spring seat in a state in which no compressive load is applied.

As shown in FIGS. 3 to 5, in a state in which the coil spring 2 is compressed, the lower surface 25b of the first taper portion 25 is in contact with the lower spring seat 10. Accordingly, the lower end turn portion 20 is supported by the lower spring seat 10 stably. In a state in which the coil spring 2 is compressed, the upper surface 26b of the second taper portion 26 is in contact with the upper spring seat 11. Accordingly, the upper end turn portion 21 is supported by the upper spring seat 11 stably. The contact force is concentrated on the first thickness varying portion 25a and the second thickness varying portion 26a.

Figure 6:
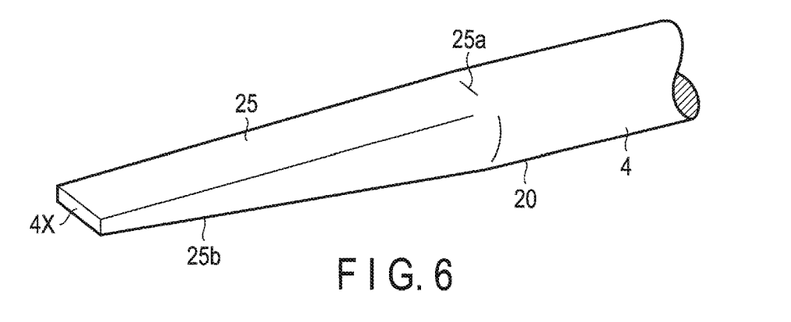
FIG. 6 is a perspective view of a taper portion of a wire of the coil spring.
Figure 7:
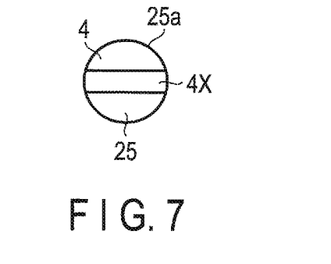
FIG. 7 is a front view of the taper portion of the wire of the coil spring.

FIG. 6 shows the lower end turn portion 20 extended linearly. At the lower end side of the wire 4, the taper portion 25 is formed from the first thickness varying portion 25a, which is provided in the middle of the end turn portion 20, to a distal end 4X of the wire 4 along its length. FIG. 7 is a front view of the wire 4 as seen from the distal end 4X. At the upper end side of the wire 4, the taper portion 26 is formed from the second thickness varying portion 26a, which is provided in the middle of the end turn portion 21, to a distal end of the wire 4 along its length.

Figure 8:
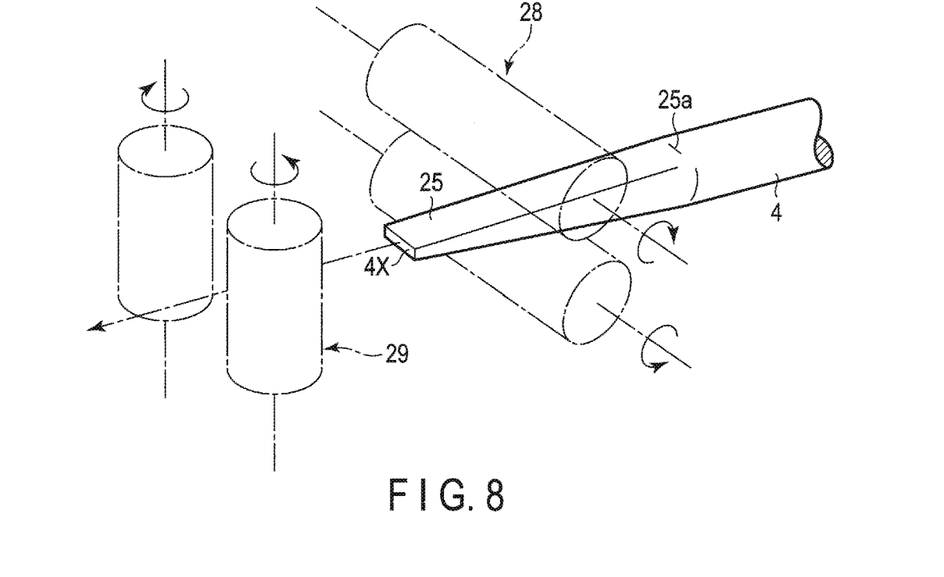
FIG. 8 is a perspective view showing a part of an apparatus which processes the taper portion of the wire of the coil spring.

FIG. 8 shows a part of an apparatus which plastically works the first taper portion 25 and the second taper portion 26. After rolling out the wire 4 by a pair of horizontal rolling rollers 28 with pressure applied from up and down, the wire 4 is rolled out by a pair of vertical rolling rollers 29 with pressure applied from right and left. By repeating this operation several times, on an end portion of the wire 4, the first taper portion 25 of a flat tapered shape is formed from the first thickness varying portion 25a to the distal end 4X of the wire 4. The width of the flat tapered first taper portion 25 is substantially equal to the diameter of the wire 4. Also on the other end portion of the wire 4, the second taper portion 26 having a flat tapered shape is formed. Each of an upper surface and a lower surface of the flat tapered taper portion is substantially flat.

Figure 9:
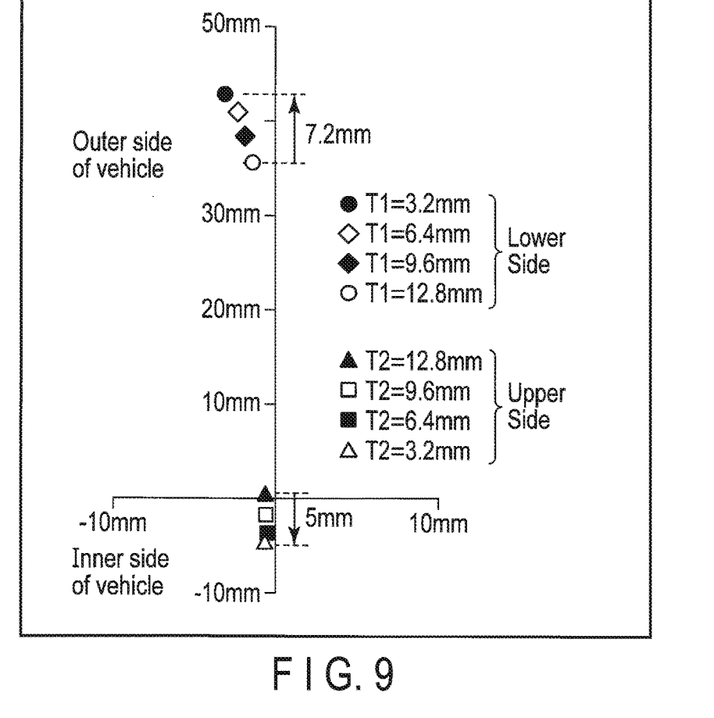
FIG. 9 is a diagram showing the relationship between first and second taper thicknesses and a force line.

FIG. 9 shows the relationship between the taper thickness, i.e., the first taper thickness T1 and the second taper thickness T2, and the force line FL. The diameter of the wire 4 is, for example, 12.8 mm. The length TL1 of the first taper portion 25 is, for example, 180 mm, and is equivalent to 0.375 turns from the lower end of the wire 4. The length TL2 of the second taper portion 26 is, for example, 186 mm, and is equivalent to 0.525 turns from the upper end of the wire 4. The numerical values described above are merely one example, and can be varied depending on the specifications of the coil spring as a matter of course.

As shown in FIG. 9, as the first taper thickness T1 is reduced, the force line FL is moved toward the outer side of the vehicle by 7.2 mm. Also, as the second taper thickness T2 is reduced, the upper end of the force line FL is moved toward the inner side of the vehicle by 5 mm. Accordingly, the force line FL is moved by 12.2 mm at the maximum. By using this feature, the inclination of the force line FL of the coil spring 2 is controlled, and an amount of deviation between the center of each of the end turn portions 20 and 21 and the center of the effective portion 22 is also adjusted, so that the force line FL can be matched to a target position.

Figure 10:
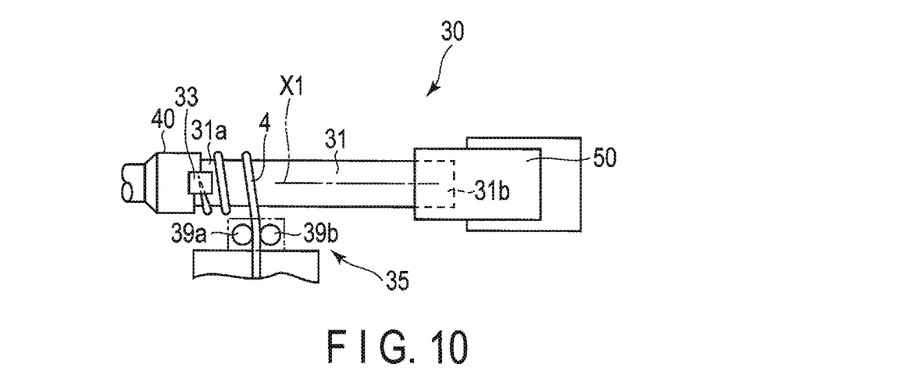
FIG. 10 is a plan view of a hot forming coiling machine.

FIG. 10 shows an example of a hot forming coiling machine 30 for producing a coil spring. The coiling machine 30 includes a columnar mandrel 31, a chuck 33, and a guide portion 35. An end portion 31a on one side of the mandrel 31 has a shape corresponding to the end turn portion on one end (the winding start side) of the coil spring. The guide portion 35 includes guide members 39a and 39b.

The wire 4 formed of spring steel is cut in a length equivalent to a length of one coil spring in advance. The wire 4 is heated to an austenitizing temperature (i.e., higher than $A_3$ transformation point and lower than 1150° C.), and supplied to the mandrel 31 by a feed mechanism. The chuck 33 fixes a distal end of the wire 4 to the mandrel 31. The guide portion 35 controls the position of the wire 4 wound around the mandrel 31. The end portion 31a on one side of the mandrel 31 is held by a mandrel drive head 40. The mandrel 31 rotates about axis X1 by the mandrel drive head 40. An end portion 31b on the other side of the mandrel 31 is rotatably supported by a mandrel holder 50. The guide portion 35 moves in the direction along axis X1 of the mandrel 31, and guides the wire 4 in accordance with a pitch angle of the coil spring to be formed.

The wire 4 has a length equivalent to a length of one coil spring. The wire 4 is heated to a temperature suitable for hot forming by a furnace. A distal end of the heated wire 4 is fixed to the mandrel 31 by the chuck 33. In addition to rotation of the mandrel 31, the guide portion 35 moves in the direction along axis X1 of the mandrel 31 in synchronization with the rotation of the mandrel 31. The wire 4 is thereby wound around the mandrel 31 at a predetermined pitch. The above explanation applies to a case of producing a coil spring by the hot forming coiling machine 30. The coil spring of the present embodiment can also be produced by a cold forming coiling machine.

Figure 11:
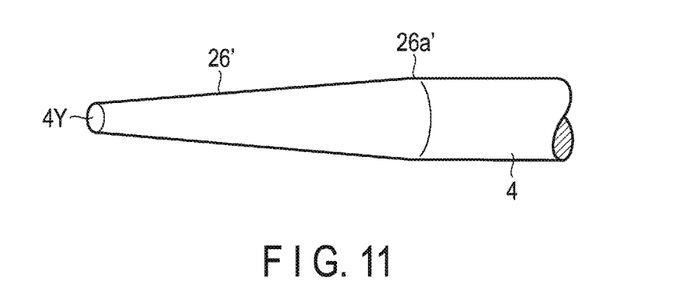
FIG. 11 is a perspective view of a taper portion according to a second embodiment.
Figure 12:
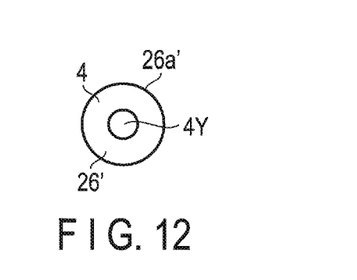
FIG. 12 is a front view of the taper portion shown in FIG. 11.

FIG. 11 shows a taper portion 26' of a round tapered shape formed at the end of a wire 4 of a coil spring according to a second embodiment. FIG. 12 is a front view of the taper portion 26' as seen from a distal end 4Y. The taper portion 26' is round tapered, that is, the diameter of the wire 4 is reduced from a thickness varying portion 26a' toward the distal end 4Y of the wire 4 while keeping a circular cross section all the way. Also with such a round tapered taper portion 26', the position of a force line FL can be controlled.

The round tapered taper portion 26' has a rotationally symmetric shape about the axis of the wire 4. When a coil spring is to be formed by the hot forming coiling machine 30 (FIG. 10), the end turn portion on the winding end side should preferably be formed as the round tapered taper portion 26'. The reason for this is that it is difficult to accurately control the position of the end turn portion on the winding end side because the wire 4 is twisted about the axis during coiling. Therefore, by adopting the round tapered taper portion 26' at the end turn portion on the winding end side, it is possible to avoid the effect of torsion of the wire 4. Since the position of the end turn portion on the winding start side can be restricted by the chuck 33, a flat tapered taper portion 25 is adopted.

Figure 13:
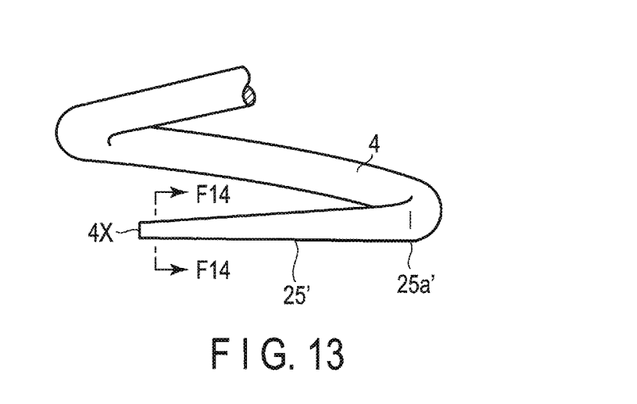
FIG. 13 is a side view of a taper portion according to a third embodiment.
Figure 14:
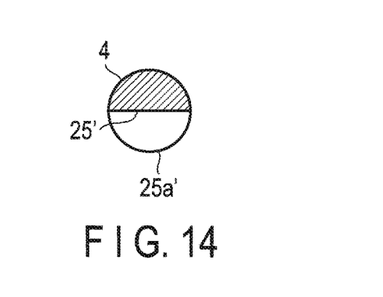
FIG. 14 is a cross-sectional view taken along line F14-F14 of FIG. 13.

FIG. 13 shows a taper portion 25' of a wire 4 of a coil spring according to a third embodiment. FIG. 14 shows a cross section of the taper portion 25' shown in FIG. 13. By polishing or grinding an end face of an end portion of the wire 4 after coiling by a grinder, etc., the taper portion 25' of a type whose end face is polished is formed. The thickness of the taper portion 25' is reduced in a tapered way from a thickness varying portion 25a' toward a distal end 4X of the wire 4. In the case of a cold formed coil spring, after coiling the wire, the taper portion 25' of the type whose end face is polished can be formed. Also with such a taper portion 25', a force line FL can be controlled.

Figure 15:
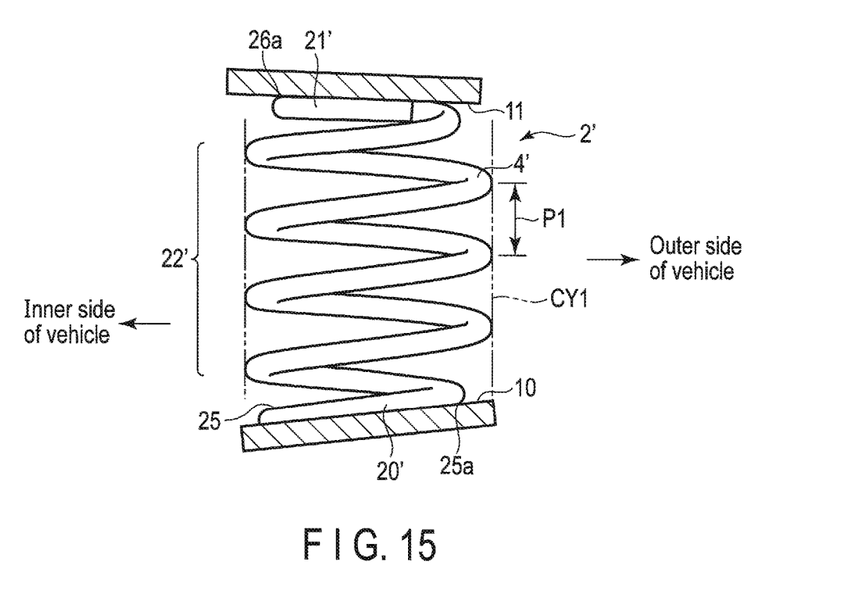
FIG. 15 is a side view of a coil spring according to a fourth embodiment.

FIG. 15 shows a coil spring 2' according to a fourth embodiment. The coil spring 2' similarly includes a lower end turn portion 20' supported by a lower spring seat 10, an upper end turn portion 21' supported by an upper spring seat 11, and an effective portion 22' between the end turn portions 20' and 21'. The number of turns of the effective portion 22' is four. In its free shape, the effective portion 22' has a shape which is substantially free of bowing (i.e., cylindrical), and pitch P1 is also substantially constant. A two-dot chain line CY1 in FIG. 15 represents the position of the outer circumference of the effective portion 22'. The meaning of "substantially constant" in the above description is that when the cylindrical effective portion 22' is formed by winding a wire around a mandrel of a hot forming coiling machine, the forming error within the range of tolerance and the variations of the shapes due to springback are of a negligible level.

At the lower end turn portion 20', a taper portion 25 whose thickness is reduced in a tapered way is formed from a thickness varying portion 25a to a distal end on the lower side of a wire 4. Although no taper portion is formed at the upper end turn portion 21', similarly to the first embodiment if necessary, a second taper portion 26 whose thickness is reduced in a tapered way from a thickness varying portion 26a may be formed. In the other embodiments, it is possible to form a taper portion only at the upper end turn portion, and not at the lower end turn portion. In other words, it is sufficient if a taper portion is formed in at least one of the lower end turn portion and the upper end turn portion.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle suspension coil spring including a wire formed into a helical shape, and being arranged between a lower spring seat and an upper spring seat, the vehicle suspension coil spring comprising:
   a lower end turn portion which is in contact with the lower spring seat;
   an upper end turn portion which is in contact with the upper spring seat;
   an effective portion having a cylindrical shape and provided between the lower end turn portion and the upper end turn portion; and
   a force line, which is a straight line, connecting a center of force applied to the lower end turn portion and a center of force applied to the upper end turn portion in a state in which a force which compresses the effective portion is applied to the lower end turn portion and the upper end turn portion,
   wherein at least one of the lower end turn portion and the upper end turn portion comprises a force-line-controlling taper portion which has a taper length and a taper thickness for approximating the force line to a target position, a thickness of the wire of the force-line-controlling taper portion is reduced in a tapered way from a thickness varying portion, which is provided at an intermediate portion of the corresponding end turn portion, toward a distal end of the wire along its length, and the thickness varying portion is arranged at a position closer to the force line than the cylindrical effective portion.

2. The vehicle suspension coil spring of claim 1, wherein the force-line-controlling taper portion is formed at the lower end turn portion, the thickness of the wire of the force-line-controlling taper portion is reduced in a tapered way for a first length from a first thickness varying portion, which is provided at an intermediate portion of the lower end turn portion, toward a lower-end-side distal end of the wire along its length, and the first thickness varying portion is arranged close to a lower end of the force line.

3. The vehicle suspension coil spring of claim 1, wherein the force-line-controlling taper portion is formed at the upper end turn portion, the thickness of the wire of the force-line-controlling taper portion is reduced in a tapered way for a second length from a second thickness varying portion, which is provided at an intermediate portion of the upper end turn portion, toward an upper-end-side distal end of the wire along its length, and the second thickness varying portion is arranged close to an upper end of the force line.

4. The vehicle suspension coil spring of claim 1, wherein:
   a first force-line-controlling taper portion is formed at the lower end turn portion, a thickness of the wire of the first force-line-controlling taper portion is reduced in a tapered way for a first length from a first thickness varying portion, which is provided at an intermediate portion of the lower end turn portion, toward a lower-end-side distal end of the wire along its length, and the first thickness varying portion is arranged close to a lower end of the force line, and
   a second force-line-controlling taper portion is formed at the upper end turn portion, a thickness of the wire of the second force-line-controlling taper portion is reduced in a tapered way for a second length from a second thickness varying portion, which is provided at an intermediate portion of the upper end turn portion, toward an upper-end-side distal end of the wire along its length, and the second thickness varying portion is arranged close to an upper end of the force line.

5. The vehicle suspension coil spring of claim 1, wherein the force-line-controlling taper portion has a flat tapered shape.

6. The vehicle suspension coil spring of claim 1, wherein the force-line-controlling taper portion has a round tapered shape.

7. The vehicle suspension coil spring of claim 4, wherein one of the first force-line-controlling taper portion and the second force-line-controlling taper portion has a flat tapered shape, and the other of the first force-line-controlling taper portion and the second force-line-controlling taper portion has a round tapered shape.

8. The vehicle suspension coil spring of claim 1, wherein the force-line-controlling taper portion has a polished end face.

9. The vehicle suspension coil spring of claim 1, wherein the effective portion is hot formed.

10. The vehicle suspension coil spring of claim 2, wherein in a free shape in which the coil spring is not compressed, the first thickness varying portion is in contact with the lower spring seat and a lower surface of the force-line-controlling taper portion is separated from the lower spring seat, and in a state in which the coil spring is compressed, the lower surface of the force-line-controlling taper portion is in contact with the lower spring seat.

11. The vehicle suspension coil spring of claim 3, wherein in a free shape in which the coil spring is not compressed, the second thickness varying portion is in contact with the upper spring seat and an upper surface of the force-line-controlling taper portion is separated from the upper spring seat, and in a state in which the coil spring is compressed, the upper surface of the force-line-controlling taper portion is in contact with the upper spring seat.

* * * * *